US 6,684,875 B1

(12) United States Patent
Schjerven, Sr. et al.

(10) Patent No.: US 6,684,875 B1
(45) Date of Patent: Feb. 3, 2004

(54) CONVEYOR OVEN WITH MODULATED GAS FLOW

(75) Inventors: William S. Schjerven, Sr., Elgin, IL (US); Mark A. Sieron, Elgin, IL (US); Tony Bruno, Elgin, IL (US); Bruce Gray, Elgin, IL (US); Gerald J. Schneeweiss, Elgin, IL (US)

(73) Assignee: Middleby Corporation, Elgin, IL (US)

( * ) Notice: Subject to any disclaimer, the term of this patent is extended or adjusted under 35 U.S.C. 154(b) by 0 days.

(21) Appl. No.: 09/760,194

(22) Filed: Jan. 12, 2001

Related U.S. Application Data
(60) Provisional application No. 60/249,685, filed on Nov. 17, 2000.

(51) Int. Cl.⁷ .............................. A21B 1/00; A23L 3/00
(52) U.S. Cl. ............... 126/21 A; 126/21 R; 126/116 A; 99/443 C; 432/176; 432/121
(58) Field of Search ............... 126/21 R, 21 A, 126/91 R, 41 C, 273 R, 116 A; 251/12, 89, 118, 175, 331; 99/443 R, 443 C; 219/400; 432/239, 133, 176, 199, 121; 34/215, 216; 236/15 A

(56) References Cited

U.S. PATENT DOCUMENTS

| 4,377,109 A | * | 3/1983 | Brown et al. ................. 99/401 |
| 4,462,383 A | * | 7/1984 | Henke et al. ............. 126/21 A |
| 4,834,063 A | * | 5/1989 | Hwang et al. ............. 126/21 A |
| 4,884,552 A | * | 12/1989 | Wells et al. ............. 126/19 R |
| 4,964,392 A | * | 10/1990 | Bruno et al. .............. 126/21 A |
| 5,033,366 A | * | 7/1991 | Sullivan ........................ 99/352 |
| 5,131,841 A | * | 7/1992 | Smith et al. .............. 126/21 A |
| 5,234,196 A | * | 8/1993 | Harris ........................ 251/328 |
| 5,253,564 A | * | 10/1993 | Rosenbrock et al. .......... 99/328 |
| 5,277,105 A | * | 1/1994 | Bruno et al. ................. 99/443 |
| 5,351,416 A | * | 10/1994 | Witkin ........................... 34/79 |
| 5,431,181 A | * | 7/1995 | Saadi et al. ..................... 137/15 |
| 5,454,295 A | * | 10/1995 | Cox et al. ................. 126/21 A |
| 5,492,055 A | * | 2/1996 | Nevin et al. ................... 99/331 |
| 5,568,802 A | * | 10/1996 | Buday et al. ............. 126/21 A |
| 5,671,660 A | * | 9/1997 | Moshonas ..................... 99/443 |
| 5,686,004 A | * | 11/1997 | Schneider ................... 219/388 |
| 5,821,503 A | * | 10/1998 | Witt ............................. 219/388 |
| 5,832,812 A | * | 11/1998 | Wolfe et al. .............. 126/21 A |
| 5,875,705 A | * | 3/1999 | Knost ........................... 99/443 |
| 5,919,039 A | * | 7/1999 | Shaw et al. ................. 432/121 |
| 5,964,044 A | * | 10/1999 | Lauersdorf et al. ........... 34/224 |
| 6,116,895 A | * | 9/2000 | Onuschak ..................... 432/59 |
| 6,141,967 A | * | 11/2000 | Angel et al. .................. 60/737 |
| 6,149,065 A | * | 11/2000 | White et al. .............. 236/15 A |
| 6,157,002 A | * | 12/2000 | Schjerven, Sr. et al. .... 219/388 |
| 6,216,683 B1 | * | 4/2001 | Maughan ................... 126/19 R |
| 6,250,296 B1 | * | 6/2001 | Norris et al. .............. 126/21 A |
| 6,252,201 B1 | * | 6/2001 | Nevarez .................... 126/21 A |

FOREIGN PATENT DOCUMENTS

DE 3536008 A1 * 8/1987 ............ A21B/1/40

OTHER PUBLICATIONS

Owner's Operating & Installation Manual for Gas Oven Models Series PS360EWB.

* cited by examiner

Primary Examiner—Henry Bennett
Assistant Examiner—Kathryn Ferko
(74) Attorney, Agent, or Firm—Michael Best & Friedrich LLC

(57) ABSTRACT

An automatic oven cooks or bakes a food product over a timed period of time during which a burner delivers heat to the oven cavity. Thermocouple sensors in the cavity control a modulator which regulates the amount of gas flowing to the burner to maintain a uniform temperature in the oven. A conveyor carries the food product in order to time the baking period.

2 Claims, 6 Drawing Sheets

CONVEYOR OVEN WITH MODULATED GAS FLOW

This application claims the benefit of Provisional application Ser. No. 60/249,685, filed Nov. 17, 2000.

This invention relates to conveyor ovens having reduced fuel consumption and quieter operation, and more particularly to such ovens having a modulated gas flow.

BACKGROUND

Prior art conveyor ovens are shown in U.S. Pat. Nos. 4,964,392 and 5,277,105 owned by the assignee of this invention and in the references cited on the cover pages of these patents. These and other similar patents may be consulted in order to learn details of how conveyor ovens are constructed and operate. Often—but not always—this type of oven is used to cook or bake pizzas, bread, or the like.

Conveyor ovens are devices for automatically baking or cooking food products over timed periods. Normally, they have a conveyor belt which travels through an elongated oven cavity having open ends and at a speed which times the exposure of the food product to the heat of the oven. A food product, such as a pizza, for example, is placed on one end of the conveyor at the entry to the oven cavity and delivered from the oven at the opposite end of the cavity. The heat in the oven and the speed of the conveyor are coordinated so that the food product is fully and correctly cooked or baked by the time when the conveyor delivers it at the exit end.

The conventional method of delivering controlled heat has been to switch burners off and on in order to hold the resulting temperature in the oven cavity within a relatively narrow range. This process has functioned very well in the past. However, anything can always be improved and, therefore, it is always possible to do a better job heating and cooking or the food product.

Also, the cost of the fuel (natural or propane gas) for the burners is increasing sharply. Thus, an important goal is to reduce the fuel consumption, which the invention has done by approximately 30%.

BRIEF DESCRIPTION OF THE INVENTION

Accordingly, an object of the invention is to cook or bake a better food product by maintaining a closer control over the uniformity of the heat in the oven cavity. Here, an object is to maintain a substantially smooth level of heat after the oven is switched on and continuing throughout the oven operation. In particular, an object is to avoid the peaks and valleys of heat swings as the burner switches on and off as it hunts for the targeted temperature.

Another object is to provide a quieter operation by eliminating a blower-like noise which occurred heretofore as the burner switched on.

Still another object is to provide a universal heat controller which can control either a modulating valve or an on/off valve, thereby eliminating a need for many controllers individually dedicated to specific ovens.

In keeping with an aspect of the invention, these and other objects are accomplished by a use of a modulating valve which increases or decreases the amount of the gas flow to a burner without fully switching the burner off or on during a bake cycle. The modulating valve is controlled responsive to temperatures sensed by thermocouple sensors located in the oven. Furthermore, the controller is also able to control an on/off gas valve in response to the same sensor signals, so that the same controller may be used universally for both the modern oven using the modulating valve and the older ovens using on/off valves.

The advantages of the invention are many. There is an improved reliability. There is a higher quality bake at a shorter bake time and at a lower temperature. The ovens operate at a lower temperature; therefore, the components are in a cooler environment which extends the life of all components. The digital speed control is more reliable than the older speed controlled by non-digital means. The oven is quieter and the energy management system is more efficient due to a use of the modulating gas valve and to a two-way air return, with less turbulence, creating lower DB levels. There is an increased flexibility making it easier to rearrange the fingers for delivering heated air to the food product. There is an ability to add a deck, as volume increases, or to remove a deck if volume falls off. All decks are the same.

BRIEF DESCRIPTION OF THE DRAWINGS

The invention will be better understood from the following specification taken with the accompanying drawings, in which.

DETAILED DESCRIPTION OF THE INVENTION

Figure 1A:
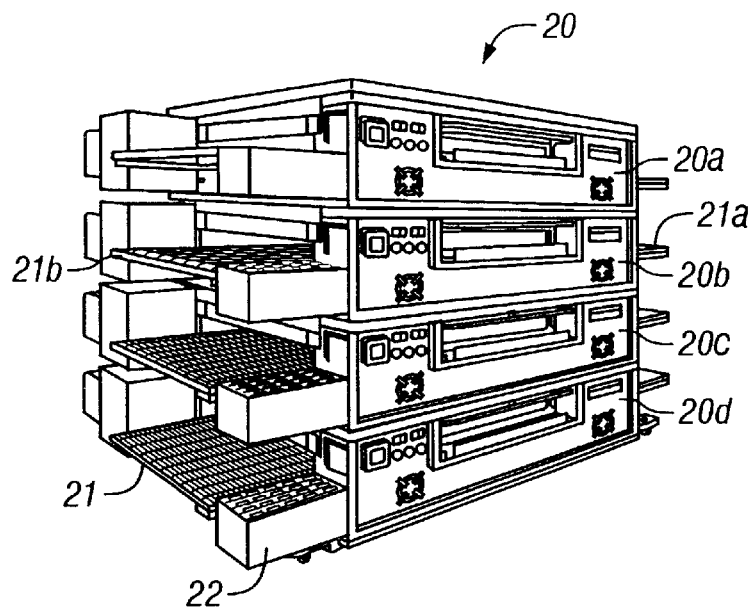
FIG. 1A is a perspective view which shows a plurality of ovens stacked one upon the other in order to increase baking capacity without increasing the oven footprint.
Figure 2:
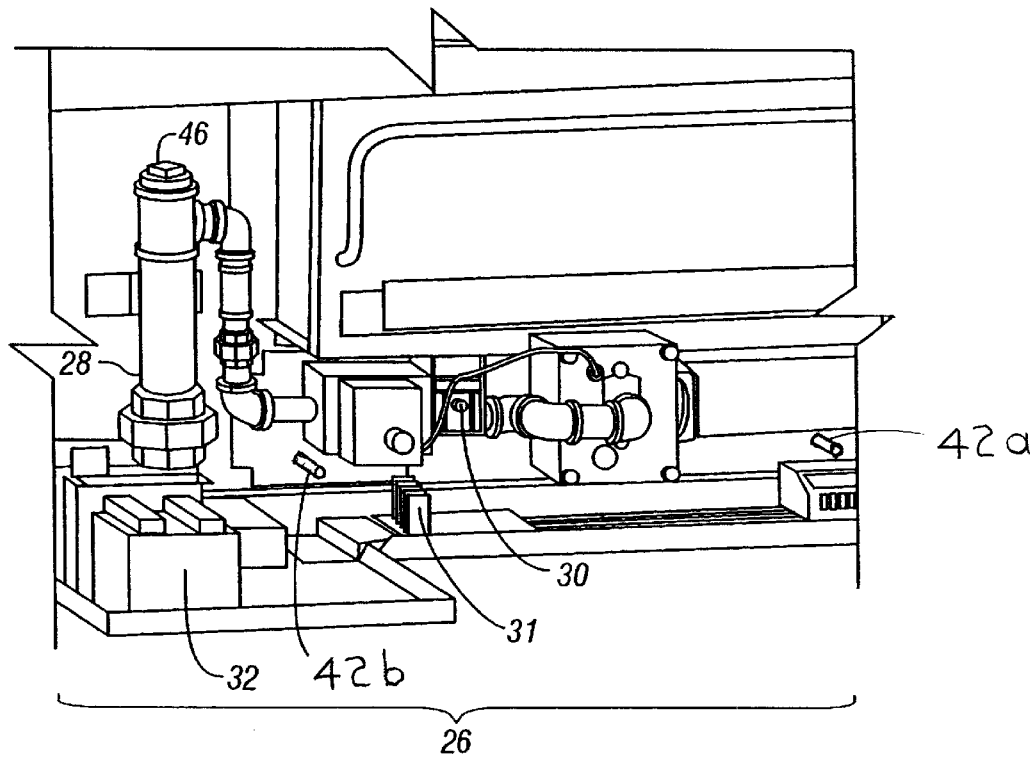
FIG. 2 is a perspective view of equipment which is seen if a side panel (not shown) is removed from conveyor oven 20a depicted in FIG. 1A.

FIG. 1A is a perspective view of four conveyor ovens 20a–20d each of which receives a conveyor 21 extending from an input end 21a through a cavity to an output end 21b of the oven. The motor for driving the conveyor is in the housing 22. FIG. 2 shows equipment which is seen if a side panel (not shown) has been removed from the housing of the oven in order to show the parts 26 which are material to the invention.

Figure 1B:
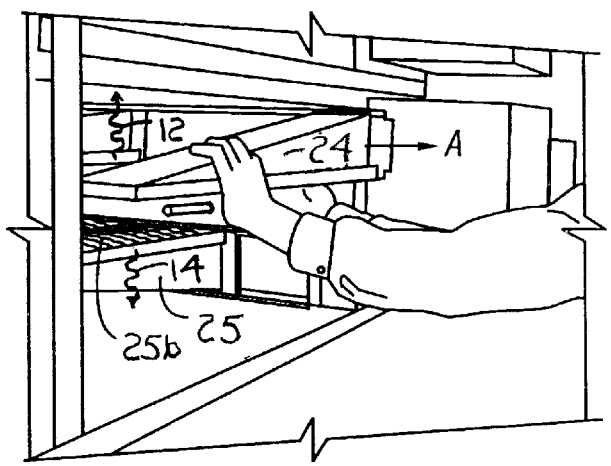
FIG. 1B is a perspective view of a hot air delivery finger being removed from the oven cavity.
Figure 1C:
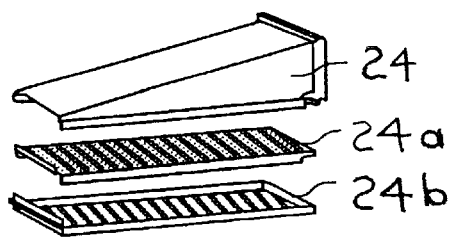
FIG. 1C is a perspective view of a disassembled finger.

In greater detail, FIG. 1A shows a plurality of the ovens 20a–20b (sometimes called "decks") stacked one on the other to increase the baking capacity without increasing the footprint dimensions. FIG. 1B is a perspective view of a person removing an upper hot air delivery finger 24 from an oven by sliding it in direction A along side rail tracks. FIG. 1C is a perspective view of the finger 24 construction where two perforated plates 24a, 24b direct streams of hot air downwardly and onto the upper surface of a food product. Lower fingers 25 direct hot air upwardly through perforated plate 25b and onto the lower surface of a food product. The hot air recycles by flowing from a plenum 10, through the fingers 24, 25 and returning by upper and lower air return flow paths 12, 14 between the top and bottom fingers 24, 25 to the plenum 10.

Figure 4A:
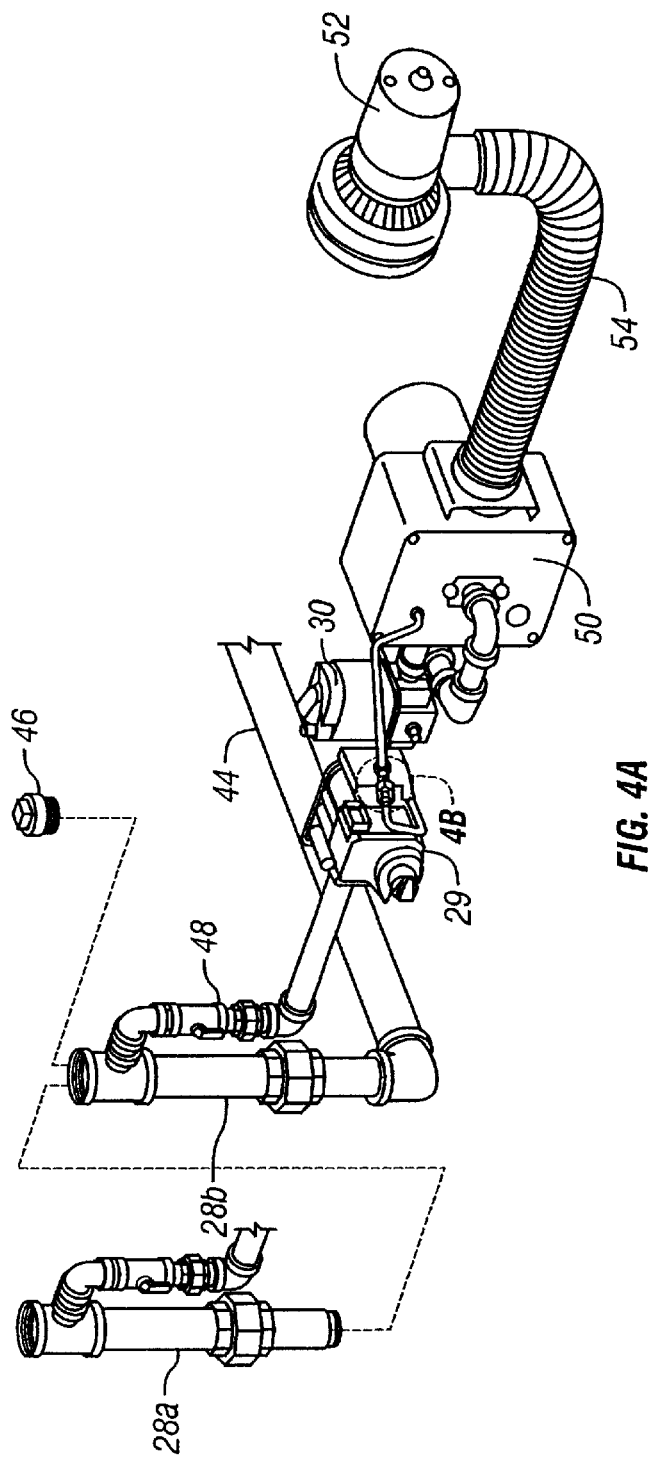
FIG. 4 is a line drawing of the parts seen in FIG. 2, together with labels identifying the various items shown in the drawing.
Figure 4B:
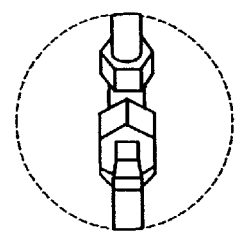

The material parts 26 are shown in greater detail in FIGS. 2 and 4. Natural or propane gas is fed from a source to the burner via a line 28 and a modulating valve 30 under the control of a signal conditioner 31 and a temperature controller 32. Both the preferred modulating valve 30 and signal conditioner 31 are products of the Maxitrol Company and are sold under the trademark "Selectra". The Maxitrol Company has a business address at 23555 Telegraph Rd (P.O. Box 2230), Southfield, Mich., U.S.A. 48037-2230.

Figure 3:
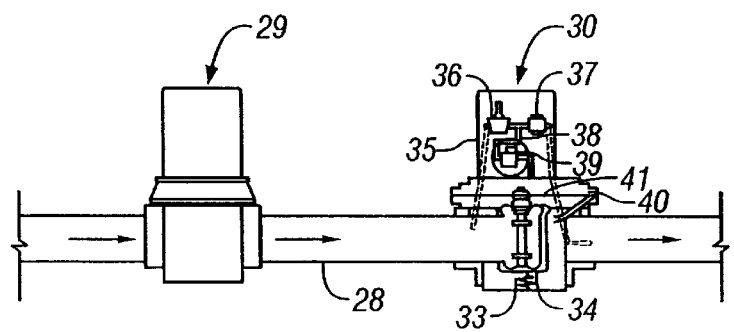
FIG. 3 is a view, partly in cross section, of an automatic safety on/off switch and a modulating switch coupled into in a gas line.

FIG. 3 shows gas line 28 extending from any suitable source of natural or propane gas on the left to a burner on the right. Interposed in the gas line between the source and the burner are two valves 29 and 30. Valve 29 is any suitable on/off valve prescribed by a regulatory agency for safety purposes. For example, a conventional valve 29 might be adapted to shut down the gas delivery responsive to excessive pressure appearing in the gas supply line.

The modulating valve 30 means is shown in cross section. A main spring 33 biases a main valve 34 into a position either to close or open the gas line 28 in order to prevent or enable a flow of gas to the burner. A by-pass line 35 is provided for enabling gas to flow around the main valve 34 and through a pressure regulator 36 even when valve 34 is closed. A manual valve 37 in the by-pass line may cut-off or allow the by-pass gas to flow, as a safety or shut down procedure. Midway between regulator 36 and the manual by-pass valve 37, a tap line 38 allows the by-pass gas to flow through modulator 39 in order to enable the gas to flow from the source into an upper chamber 40 which is closed by a diaphragm 41. Modulator 39 is controlled responsive to signals from thermocouple sensors 42 in the oven. As the oven becomes colder, the diaphragm moves down, and as it becomes hotter, the diaphragm moves up. Hence, the diaphragm 41 moves up or down as a function of the instantaneous oven temperatures.

As the diaphragm 41 moves down, it overcomes the bias of spring 33 and opens main valve 34 by a distance which enables a volume of gas to flow in line 28 depending on the distance that valve 34 has moved.

If the oven temperature sensed at 42 goes down, the modulator 39 enables more gas flow from the by-pass line 35 to increase pressure in upper chamber 40, thereby deflecting the diaphragm 41, pushing valve 34 against the bias of spring 33 and opening the main valve 34 by a discrete distance. If the oven temperature sensed at 42 goes up, modulator 39 restricts the flow of by-pass gas, the pressure in upper chamber 40 reduces, the diaphragm 41 returns somewhat from its deflected condition, and spring 33 pushes the valve 34 to a more closed position.

Hence, it should now be clear that the amount of gas delivered to the burner follows the instantaneous fluctuations of the oven temperature. With a need for a low fire, there is little or no pressure on the diaphragm 41 and gas flows only through a by-pass and at a very low rate. In between the high and low demands for a high level of fire and a low level of fire, the pressure in the upper chamber 40 will have an intermediate effect upon the deflection of diaphragm 41 and, therefore, on the position of main valve 34 and the amount of gas flowing to the burner.

The temperature controller 32 is a device which receives a signal from thermocouple sensors located in the baking cavity of the oven. The sensor may continuously supply any convenient signal indicating the instantaneous oven temperature. The signal conditioner 31 interfaces between the temperature controller 32 and the modulating valve 30 by converting the sensor signal into a signal which the modulating valve uses.

The details on the arrangement of the various parts described thus far are best seen in FIG. 4. The gas is delivered from any convenient source through a line 44 to the various ovens via a pipe 28. As here shown, it may be assumed that pipe 28a is in oven 20a (FIG. 1A) and pipe 28b is in oven 20b. The remainder of the ovens 20c, 20d are served in a similar manner. The top oven has a pipe 28a which is closed by a cap 46.

The manual shut-off valve 48 simply provides for a complete shut down of the system. Usually, this valve is left in an "on" position.

The automatic valve 29 is a conventional device which meets any local safety standards. While such safety valves tend to be fairly uniform, various locations may have their own, non-standard requirements.

Next, the modulating gas valve 30 is located to admit a regulated amount of gas into a burner 50. While any suitable burner may be used, a high efficiency burner is preferred. These burners are found in many appliances from heavy duty home heating to relatively light duty in appliances.

A blower 52 is coupled to the burner 50 via a suitable duct 54 in order to supply combustion air to the burner. When there is a mixture of gas and force air as the burner first comes on, there is usually a very noisy roar; hence, a blower which switches off and on is noisy. The invention avoids this noise by modulating the flow of gas which never shuts off as demand increases and decreases when the oven temperature decreases or increases.

Figure 5A:
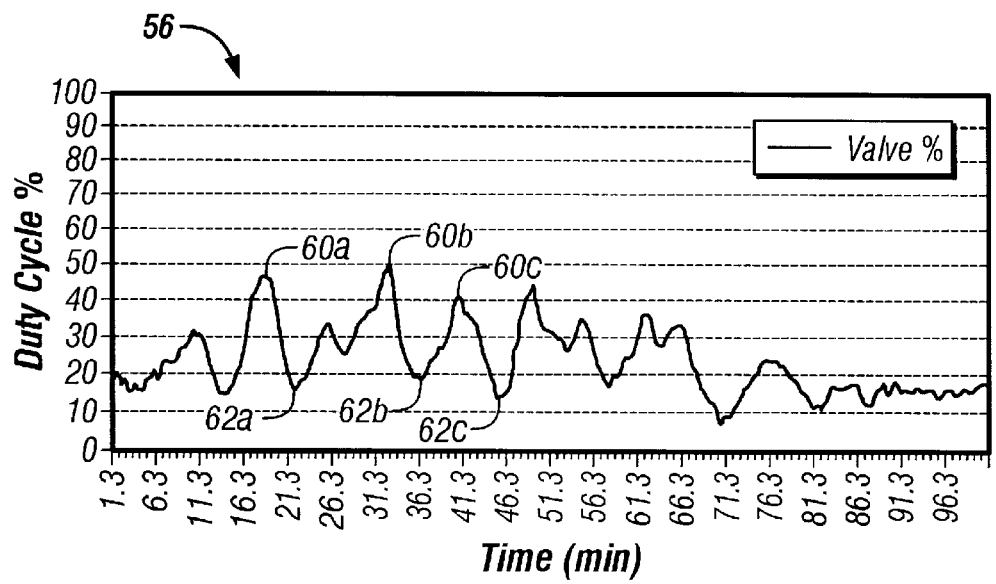
FIG. 5 is a graph which illustrates the peaks and valleys of the burner duty cycle of the prior conveyor ovens using on/off gas valves.
Figure 5B:
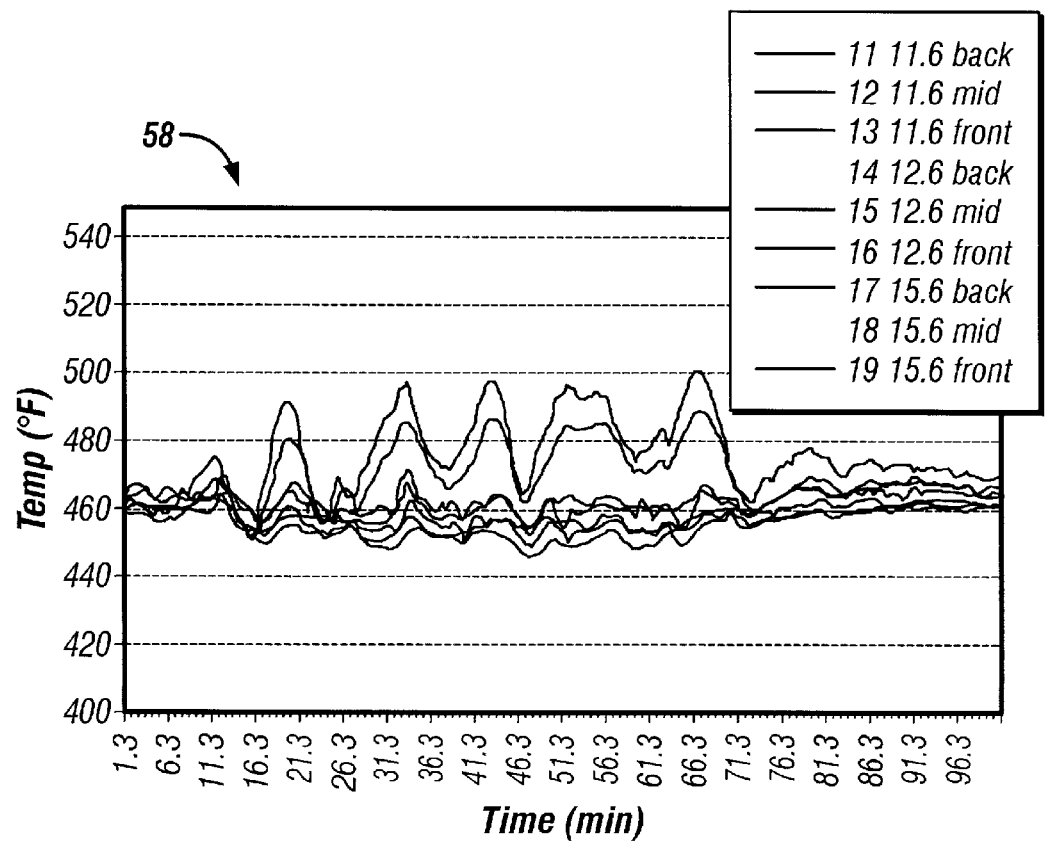

FIG. 5 is a graph which discloses at 56 the duty cycle of the prior art burner as it responds to the temperature sensed in the oven and at 58 the temperature fluctuations at various locations in the oven. The prior art burner duty cycle 56 is shown as having peaks 60a, 60b, 60c, as the burner is generating maximum heat and valleys 62a, 60b, 60c when the burner is shut down. The food product may have a variegated cooking or baking depending upon the peaks and valleys. The peaks and valleys depend upon sensed oven temperatures. Those temperatures vary with ambient temperatures, drafts, frozen or thawed condition of the food product, etc. Hence, it is not possible to predict with any certainty as to the relationship between the appearances of the peaks and valleys relative to the excursion of the food product on the conveyor.

A second point indicated in FIG. 5 is that there is a considerable demand for fuel because the oven heats and cools depending upon the peaks and valleys. Hence, the burner has to work harder to repeatedly recover from a cool down in the off stage.

Figure 6A:
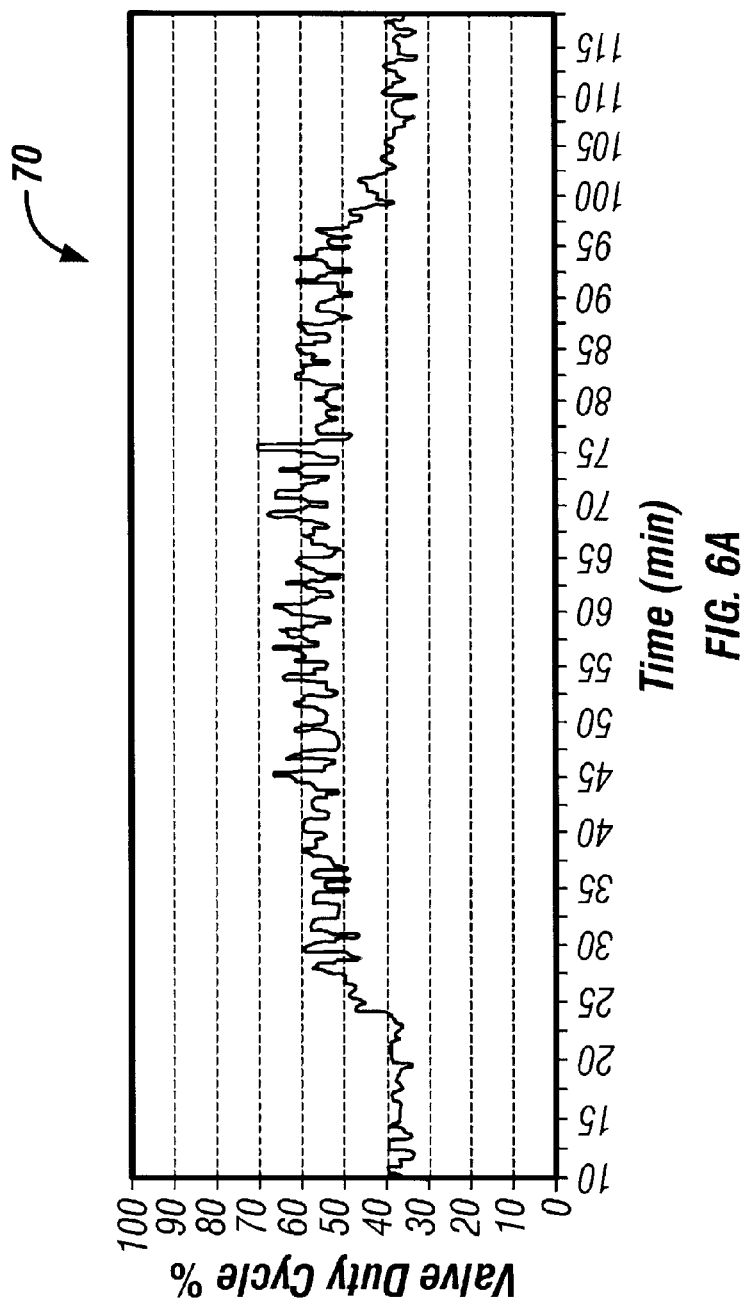
FIG. 6 is a graph which illustrates the continuous burner operation responsive to the inventive modulated gas flow.
Figure 6B:
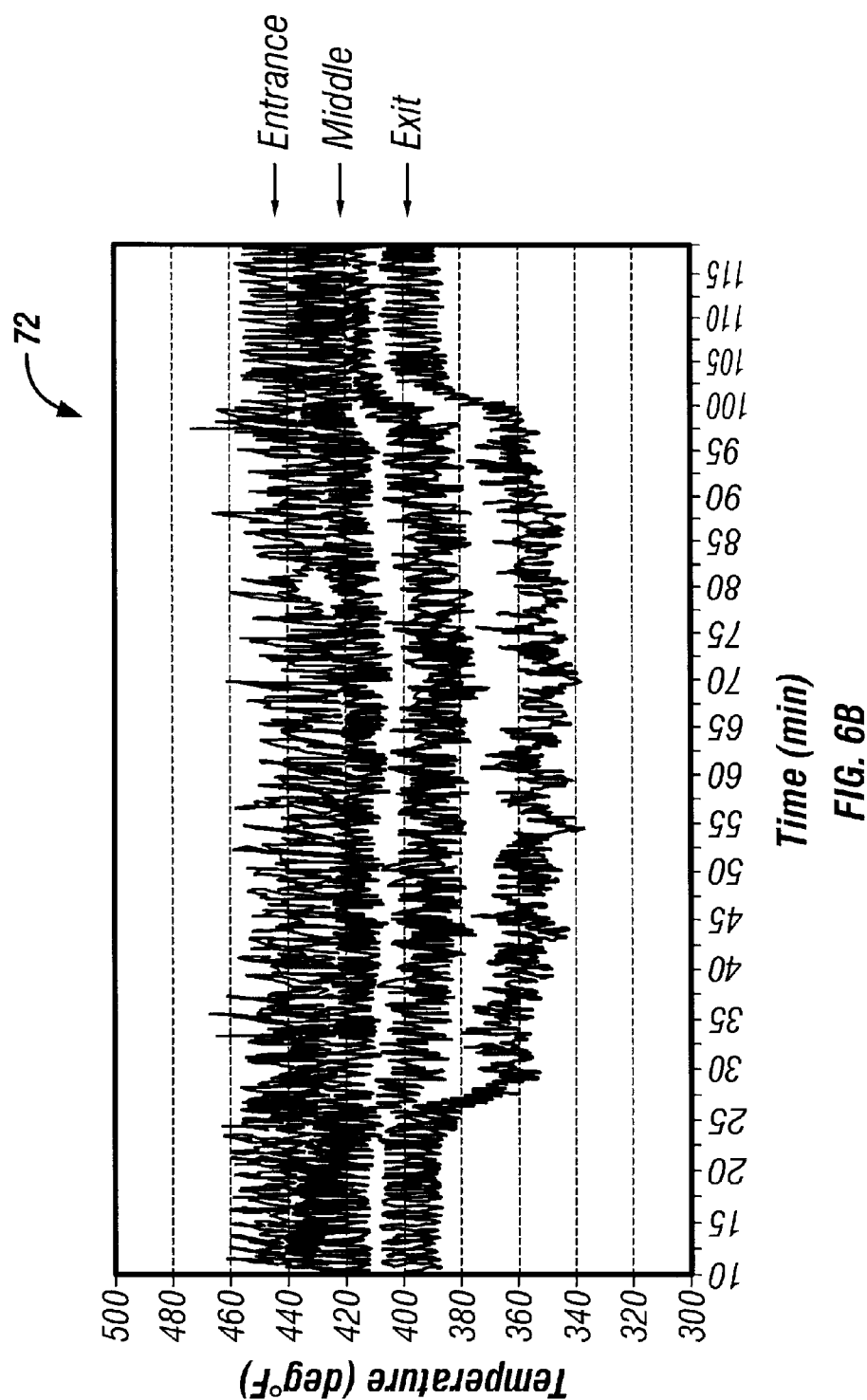

FIG. 6 is a graph similar to FIG. 5, but showing the operation responsive to the inventive use of the modulating valve 30. The flow of gas to the burner is seen in the curve 70. While the gas flow varies almost continuously, it is never off, so that the burner modulates its out put within a relatively narrow band but does not shut down. Since the burner does not come on suddenly, there is no blow torch-like roar at the ignition. Curve 72 shows the temperatures sensed at the front, exit and middle of the oven. While this curve shows that the sensor does track the instantaneous variations of the heat put out by the burner, the average temperature in the oven is much more uniform over time.

The most important feature is that the fuel required to maintain the burner operation represented by curve 56 (FIG.

5) is 30% greater than the fuel required to maintain the burner operation represented by curve 70 (FIG. 6).

Those who are skilled in the art will readily perceive various modifications that fall within the scope and spirit of the invention. Therefore, the appended claims are to be construed to cover all equivalents.

What is claimed is:

1. A conveyor oven for heating a food product by directing hot air onto the surface of the food product, which conveyor oven comprises:

an oven including two walls which cooperatively define a cavity extending through the oven;

a conveyor extending through the cavity;

a gas-fired burner for heating air in the cavity;

a gas line for transporting gas from a gas source to the burner;

a gas modulating valve in the gas line between the gas source and the burner for modulating a flow of gas to the burner when the conveyor oven is operating;

two or more thermocouples in the cavity for sensing oven temperatures and sending signals;

a controller responsive to the signals for controlling the gas modulating valve to regulate the flow of gas to the burner in order to maintain the oven temperatures within a predetermined range;

a plurality of upper fingers extending into the cavity, each of the upper fingers including means for directing hot air downwardly onto the upper surface of a food product, and at least one pair of the upper fingers cooperatively defining an upper air return path between adjacent ones of the upper fingers;

a plurality of lower fingers extending into the cavity, each of the lower fingers including means for directing hot air upwardly onto the lower surface of the food product, and at least one pair of the lower fingers cooperatively defining a lower air return path between adjacent ones of the lower fingers; and a plenum pneumatically communicating with the upper and lower fingers for delivering air from the burner and the upper and lower paths to the upper and lower fingers and for receiving air from the burner and the upper and lower air return paths.

2. The oven of claim 1 wherein there are at least three of the thermocouples located at an entrance, a midpoint, and an exit of the oven.

\* \* \* \* \*